United States Patent [19]
Lewis et al.

[11] Patent Number: 5,377,003
[45] Date of Patent: Dec. 27, 1994

[54] SPECTROSCOPIC IMAGING DEVICE EMPLOYING IMAGING QUALITY SPECTRAL FILTERS

[75] Inventors: Edgar N. Lewis, Brookeville; Ira W. Levin, Rockville; Patrick J. Treado, Kensington, all of Md.

[73] Assignee: The United States of America as represented by the Department of Health and Human Services, Washington, D.C.

[21] Appl. No.: 236,655

[22] Filed: Apr. 29, 1994

Related U.S. Application Data

[63] Continuation of Ser. No. 846,824, Mar. 6, 1992, abandoned.

[51] Int. Cl.$^5$ .............. G01J 3/44; G01J 3/45; G01N 21/64; G01N 21/35
[52] U.S. Cl. .............. 356/300; 250/339.02; 250/458.1; 356/301; 356/318; 356/346
[58] Field of Search .............. 356/300, 301, 308, 309, 356/326, 328, 346, 317, 318; 359/308, 309, 285; 250/339, 458.1, 459.1, 461.1, 461.2

[56] References Cited

U.S. PATENT DOCUMENTS

| | | | |
|---|---|---|---|
| 4,653,869 | 3/1987 | Gottlieb et al. | 359/308 |
| 5,039,855 | 8/1991 | Kemeny et al. | 250/339 |
| 5,048,959 | 9/1991 | Morris et al. | 356/301 |
| 5,216,484 | 6/1993 | Chao et al. | 356/326 |

FOREIGN PATENT DOCUMENTS

| | | | |
|---|---|---|---|
| 214129 | 12/1983 | Japan | 359/308 |
| 80821 | 5/1985 | Japan | 359/308 |
| 265131 | 10/1989 | Japan | 359/285 |

OTHER PUBLICATIONS

Gottlieb et al, SPIE, vol. 232, 1980 International Optical Computing Conference (1980), pp. 33–41.
SPIE, vol. 1347 "Optical Information Processing Systems and Architectures II" (1990); article entitled Acousto–Optic Tunable Filter (AOTF) Imaging Spectrometer for NASA Applications: Systems Issues by Jeffrey Y, Tien Hsin Chao and Li–Jen Cheng.
SPIE, vol. 1347 "Optical Information Processing Systems and Architectures II" (1990); article entitled Acousto–Optic Tunable Filter (AOTF) Imaging Spectrometer for NASA Applications: Breadboard Demonstation by Tien–Hsin Chao, Jeffrey Yu, Li–Jen Cheng & Jim Lambert.
Jun. 7, 1985 Article by Goetz et al., Imaging Spectrometry for Earth Remote Sensing, Science, vol. 228, No. 4704.
1986 Book by Taylor et al., Applications of Fluorescence in the Biomedical Sciences, Liss, New York.
1990 Article by Levin et al., Fourier–Transform Raman Spectroscopy of Biological Materials, Anal. Chem., 62(21).
1989 Article by Treado et al., Multichannel Hadamard Transform Raman Microscopy, Appl. Spectrosc., 44(2).
Nov. 1987 Article by Kurtz et al., Rapid scanning fluorescence spectroscopy using an acousto–optic tunable filter, Rev. Sci. Instrum., vol. 58, No. 11.
1987 Article by Bilhorn et al., Spectrochemical Measurements with Multi–Channel Integrating Detectors, Applied Spectroscopy 41, 1125.

*Primary Examiner*—F. L. Evans
*Attorney, Agent, or Firm*—Leydig, Voit & Mayer, Ltd.

[57] ABSTRACT

Techniques for providing spectroscopic imaging integrates an acousto-optic tunable filter (AOTF), or a step-scan interferometer, and a focal plane array detector. In operation, wavelength selectivity is provided by the AOTF or the step-scan interferometer. A focal plane array detector is used as the imaging detector in both cases. Operation within the ultraviolet, visible, near-infrared (NIR) spectral regions, and into the infrared spectral region, is achieved. The techniques can be used in absorption spectroscopy and emission spectroscopy. Spectroscopic images with a spectral resolution of a few nanometers and a spatial resolution of about a micron, are collected rapidly using the AOTF. Higher spectral resolution images are recorded at lower speeds using the interferometer. The AOTF technique uses entirely solid-state components and requires no moving parts.

21 Claims, 9 Drawing Sheets

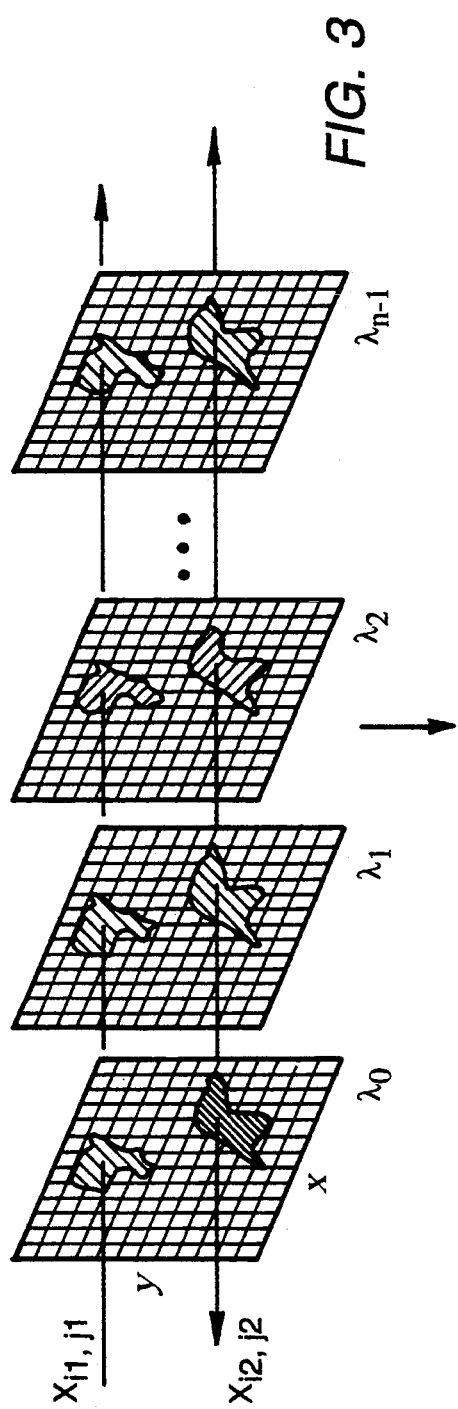
FIG. 3
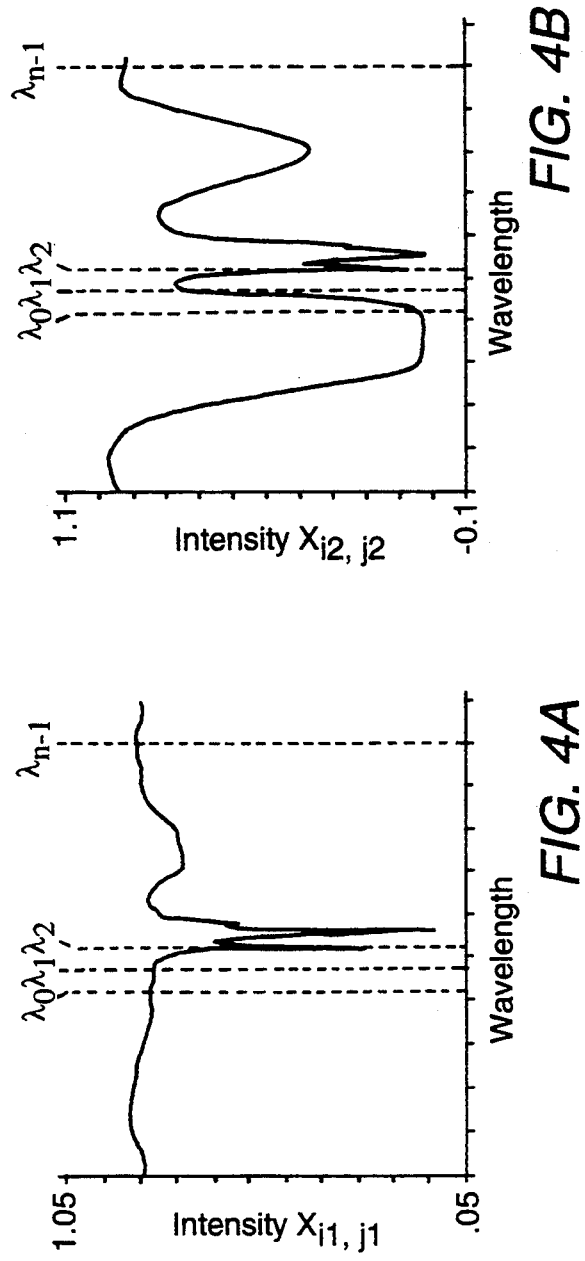
FIG. 4B
FIG. 4A

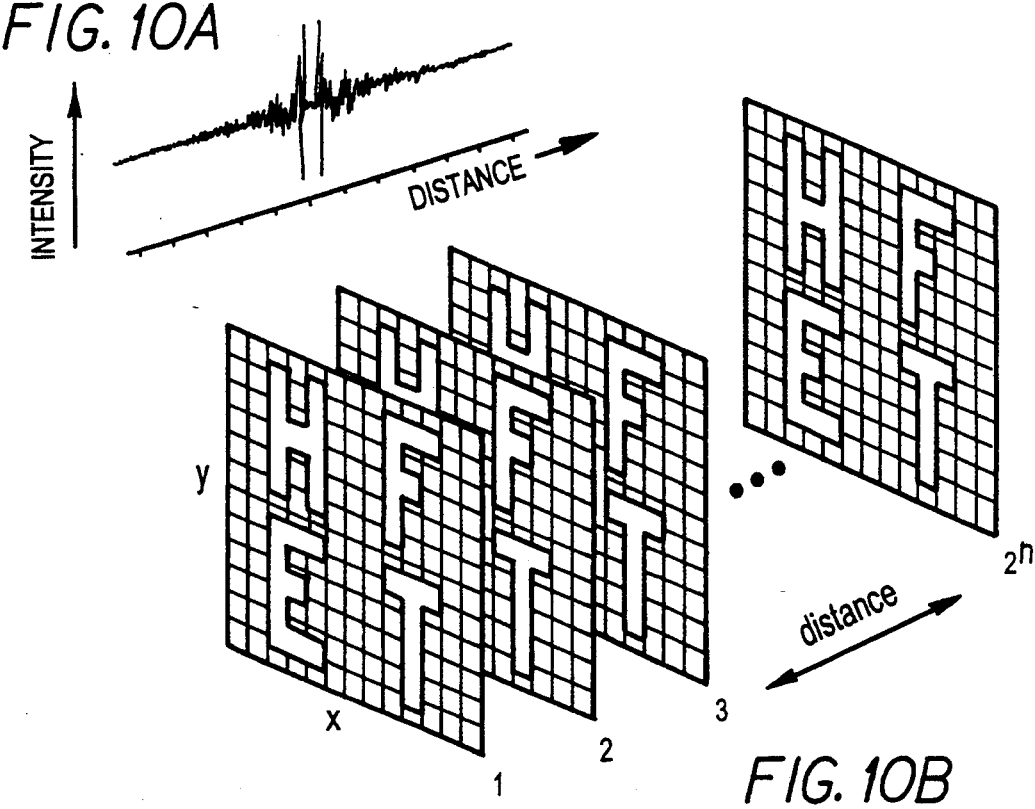
FIG. 10A
FIG. 10B
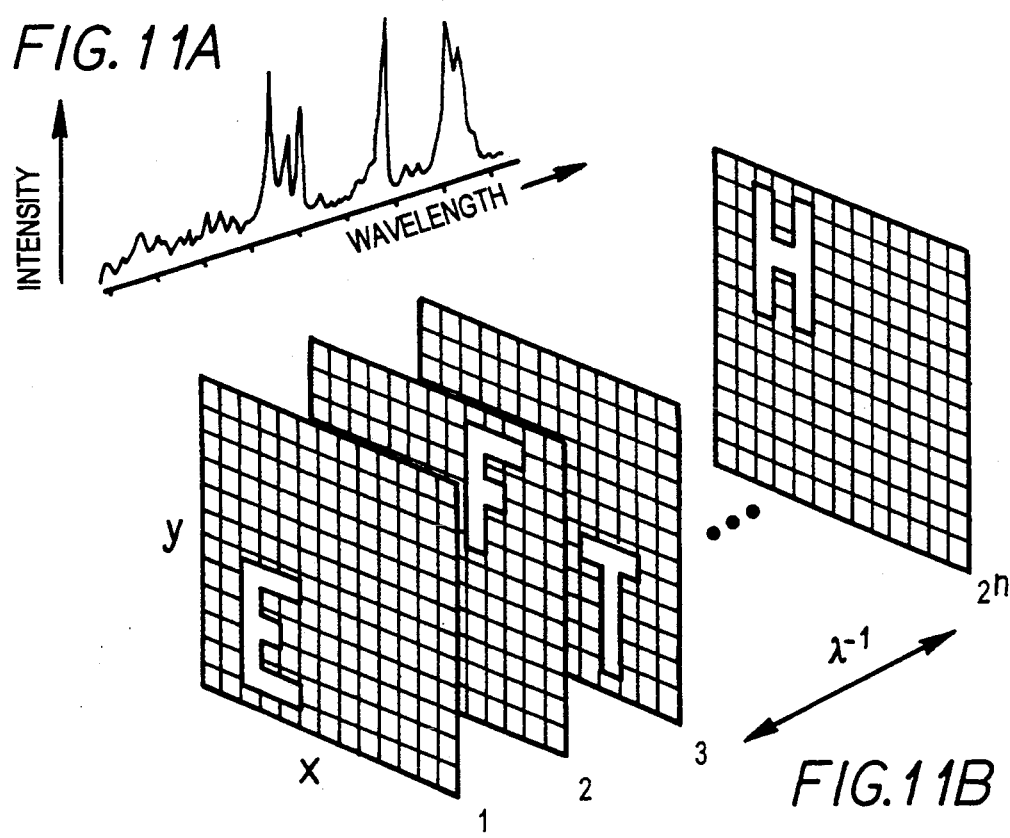
FIG. 11A
FIG. 11B

SPECTROSCOPIC IMAGING DEVICE EMPLOYING IMAGING QUALITY SPECTRAL FILTERS

This is a continuation of copending application Ser. No. 07/846,824 filed on Mar. 6, 1992, now abandoned.

FIELD OF THE INVENTION

The present invention relates to devices used for spectroscopic imaging, and more particularly to devices that non-invasively and rapidly collect images of a sample at multiple, discrete wavelengths in the ultraviolet, visible, near-infrared and infrared regions of the optical spectrum. The character of the images recorded is determined by a sample's chemical characteristics as revealed by its intrinsic electronic and vibrational absorptions or emissions.

BACKGROUND OF THE INVENTION

Spectroscopic imaging can be used to determine the spatially distributed and chemically distinct species in heterogenous materials. Spectroscopic imaging is an analytical tool that has been applied at both the macroscopic and microscopic levels.

At the macroscopic level, chemical imaging of areas exceeding 20 square kilometers can be achieved using airborne and spaceborne remote sensing, near-infrared imaging spectrometers. On a smaller scale, diagnostic imaging of the human body is possible through nuclear magnetic resonance imaging techniques (MRI).

At the microscopic level, fluorescence imaging is a technique employed for chemical state microscopy. Fluorescence is the emission of radiation (light) through which a molecule in an electronically excited state is able to dissipate its excess energy. Molecular fluorescence emission normally occurs at visible wavelengths. Fluorescent intensities from fluorophores (analyte molecules with fluorescent properties) which exhibit high quantum efficiencies can be relatively strong. Fluorescence spectroscopy, in general, is an extremely sensitive technique. In fact, single molecule detection has been demonstrated utilizing fluorescence spectroscopy. Fluorescence microscopy involves the labeling of a specific component of interest with a fluorescent tag and the subsequent viewing of the spatially resolved fluorescence emission. Improved specificity can be provided by immuno-fluorescent tags in which the analyte is an antigen that binds to a fluorescently tagged antibody. Many types of fluorescent immunoassays have been developed and are widely used in biomedical and biological imaging. Additional background information on fluorescence microscopy can be found in "Applications of Fluorescence in the Biomedical Sciences," D. L. Taylor, A. S. Waggoner, R. F. Murphy, F. Lanni, R. R. Birge (eds.), Liss, New York (1986).

Another class of spectroscopic microscopy techniques employs vibrational spectroscopy. Specifically, the methods of Raman and infrared spectroscopy provide chemical selectivity without requiring undue sample preparation or incurring sample alteration or degradation. Raman spectroscopy, an inelastic light scattering phenomenon, is commonly used to characterize a sample on the basis of its molecular vibrational spectrum. The Raman scattering phenomenon is observed by illuminating a sample with a high intensity monochromatic source, such as a laser, and detecting the fraction of light scattered at longer wavelengths. Typically, about 1 Raman photon is scattered per $10^8$ incident photons. The frequency displacements of the Raman scattered light from the incident laser radiation correspond to the vibrational frequencies of the sample molecules. Since the vibrational spectral bandwidths observed in Raman spectroscopy are usually 5–30 $cm^{-1}$ (0.3–2 nm at 750 nm), spectroscopic devices must be able to resolve, as well as detect, these faint signals.

Traditionally, Raman spectroscopy has been performed using visible wavelength lasers, optics and detectors coupled to monochromators that employ diffraction gratings for spectral dispersion and isolation. More recently, laser-referenced Michelson interferometers have been employed in conjunction with solid-state near-infrared (NIR) laser excitation, primarily Nd:YAG, for Fourier transform (FT) Raman spectroscopy. Additional information can be found in "Fourier-Transform Raman Spectroscopy of Biological Materials," Anal Chem., 62(21) 1990, Ira W. Levin and E. Neil Lewis. One advantage of FT-Raman spectroscopy is the improved instrumental performance of FT interferometers over standard monochromators. Specifically, the instrument provides intrinsic throughput (Jacquinot's advantage) and multiplex (Fellgett's advantage) characteristics, as well as high spectral precision (Connes' advantage) and the capacity for high spectral resolution. Commercial FT interferometer systems can typically provide 0.02–5 $cm^{-1}$ (0.02–5 nm at 3300 nm) spectral resolution. Current interferometer based instruments are optimized for maximum signal throughput, but are designed without regard for maintaining image fidelity through the device. An FT interferometer that retains image fidelity would provide the inherent advantages of interferometry and could also be suitable for spectroscopic imaging.

Infrared (IR) spectroscopy involves the absorption of IR radiation, generally between 770–100000 nm (12,900–100 $cm^{-1}$), by molecular species. Energies in the infrared region of the spectrum are on the order of the energies of vibrational transitions, and IR spectroscopy is complementary in its information content to Raman spectroscopy. IR spectroscopic imaging is applicable to a wide range of materials, but is especially well suited to the study of polyatomic organic molecules, as vibrational frequencies are well correlated with organic functional groups. In particular, IR and Raman spectroscopies are suitable for the study of biological materials. Almost all materials absorb infrared radiation, except homonuclear diatomic molecules ($O_2$, $H_2$, $N_2$). Polyatomic molecules exhibit rich IR spectra. The spectra include both the fundamental absorptions in the mid-IR (2500–200000 nm), but also the overtones and combination bands, primarily of O—H, C—H and N—H absorptions, in the near-IR (770–2500 nm). While the near-IR bands are significantly weaker than the fundamental bands, the wavelengths at which they are observed are compatible with quartz and germanium refractive optics, making the near-IR region of the spectrum well suited for high spatial resolution chemical state imaging studies based on molecularly specific vibrational absorptions.

The sensitivity of Raman and infrared spectroscopy to even small changes in molecular structure is well established, and these techniques are capable of generating specific fingerprints for a given molecular species. In general, systems capable of generating infrared absorption or Raman emission images find wide use in a variety of areas in science and technology. Materials amenable to these types of analysis would include, but not be limited to biological materials, polymers, superconductors, semiconductors and minerals.

Currently, two primary methods are employed for image generation. The first approach involves the systematic scanning of a sample. Typically, this is achieved either by translating the sample through a stationary field of view defined by the collection optics and detector, or alternatively, by scanning the imaging source (or detector) in a raster pattern across the surface of the stationary sample. The scanning approach is typically utilized with a single element detector. An example of a vibrational spectroscopic imaging device employing the scanning method is a Fourier transform infrared (FTIR) spectrometer coupled to a mid-infrared microscope outfitted with an x-y mapping translation stage for imaging a sample. The technique utilizes the infrared (vibrational) absorption properties of molecular functional groups in the sample to generate the image.

Scanning methods for vibrational spectroscopic imaging, while workable, have certain drawbacks and deficiencies. Specifically, the signal to noise ratios obtainable with FTIR microspectrometers often requires substantial signal averaging at each spatial position, thus making the FTIR systems inherently slow. As a result, only crude spatial maps are generally obtained. In addition, the near-infrared imaging spectrometers employed for remote sensing typically use diffraction gratings for spectral characterization which require that images be constructed a slice at a time as the spectrometer scans the sample surface. Furthermore, the numerous moving parts contained within these systems limit the speed and reliability of these devices.

A second method of image generation involves wide field illumination and viewing in conjunction with multichannel detection. Direct viewing with a color video camera of a subject illuminated by a broadband visible source is a simple example of wide field illumination imaging. In such a case, colorometric information based on the visible absorption of the sample is obtained.

For greater specificity and selectivity, fluorescence microscopy may be performed. In fluorescence microscopy, optical filtering of an intense arc lamp illumination source to select strong plasma lines can be employed to selectively excite a molecular fluorescent label added to a sample. Alternatively, a laser is employed for illumination having a wavelength output which falls within the absorption range of the fluorescent label and selectively excites the tag. The fluorescent light, which emits at longer wavelengths than the excitation source, is commonly discriminated using dielectric interference filters. Where several spectral regions are to be viewed separately, filter wheels containing multiple filters can be utilized. Fluorescent spectral linewidths are usually 10–100 nm wide. Where only a single type of fluorophore is present in a sample, spectral filters providing relatively broad spectral resolution, 5–25 nm, can be adequate. Where multiple similar fluorophores are present simultaneously, multiple filters providing spectral resolution of 1–2 nm may be necessary.

Wide field illumination methods employing glass or interference filters, however, have certain drawbacks and deficiencies. Specifically, the application of discrete notch filters for spectral selectivity requires the use of a separate filter at each desired wavelength, ultimately limiting operation to only several wavelengths. In addition, the dielectric notch filters employed provide resolution of approximately 10–100 nm, which is often an inadequate spectral resolution for discriminating similar but different species in multicomponent environments. The techniques using filter wheels provide only limited spectral resolution and spectral coverage, and also suffer from the constraints of moving mechanical parts, limiting the speed and reliability of these systems.

A hybrid spectroscopic imaging method combining wide field illumination and multichannel detection with spatial multiplexing has been developed. The technique is called Hadamard transform spectroscopic microscopy and has been especially adapted for Raman emission microscopy. Additional information can be found in "Multichannel Hadamard Transform Raman Microscopy", Appl. Spectrosc., 44(2) 1989, Patrick J. Treado and Michael D. Morris. The technique employs a dispersion spectrograph as the spectral filter and is capable of generating spectral images of a variety of materials at sub-micron spatial resolution.

The multichannel/spatial multiplex method, however, also has certain limitations. Specifically, the number of spectral features that can be collected simultaneously is determined by the inherently limited spectral coverage of the spectrograph. Where survey spectral images are to be collected, the Hadamard imager is not optimal. In addition, artifacts can arise in the spectral images due to systematic spatial encoding errors. These artifacts ultimately compromise the spatial resolution of the technique.

Summary Of The Invention

Accordingly, a general object of the present invention is to provide devices for rapidly filtering light sources in the ultraviolet, visible, near-infrared and infrared regions of the optical spectrum for utilization in absorption microscopy while retaining image fidelity. Another general object of the present invention is to provide devices for spectrally filtering emitted radiation from samples encountered in emission microscopy, specifically fluorescence and Raman microscopy, while retaining image fidelity.

An additional object of the present invention is to provide a solid-state spectroscopic imaging device that contains no moving parts and that is capable of rapidly generating 1–2 nm spectral resolution, and diffraction-limited spatial resolution images of the molecular species comprising the desired sample in the ultraviolet, visible, near-infrared and infrared regions of the optical spectrum.

Yet another object of the present invention is to provide the ability to collect spectroscopic data sets and manipulate the data sets to reveal the precise molecular arrangements of the samples analyzed, including particularly subtle molecular arrangements not easily determinable by other analytical imaging techniques.

The foregoing and other objects are accomplished by the present invention, using an acousto-optic tunable filter (AOTF) in conjunction with a two dimensional array detector to non-invasively and rapidly collect spectral images of a sample under conditions of high spatial resolution. The images are derived from the intrinsic electronic and vibrational absorptions and emissions of the material.

In accordance with one aspect of the present invention, absorption spectroscopy is achieved by filtering a light source using an AOTF. The AOTF filters broadband light at pre-selected wavelengths. The filtered light is then directed toward the sample of interest. For thin samples, the filtered light may be transmitted through the sample; alternatively, for thick samples and opaque materials, the filtered light is preferably diffusely reflected by the sample. The transmitted or reflected light is directed toward the two dimensional array detector which measures the intensity of the light at multiple locations within the sample. After retrieving the spectroscopic information from the two dimensional array detector, the data is analyzed, manipulated, and displayed using spectroscopic, chemometric and image processing techniques.

An advantage to the present invention includes the ability to rapidly and simultaneously record and analyze thousands of absorption spectra with high spatial resolution. Unlike other techniques there is no compromise in the amount of time required to record data with adequate spectral characteristics versus high image fidelity. Typically image clarity is limited only by the type of imaging detector (CCD) employed.

In accordance with another aspect of the present invention, emission spectroscopy is achieved by directing a monochromatic light source (e.g. a laser), or nearly monochromatic light source (e.g. a filtered arc lamp) toward a sample to be analyzed. The resulting sample emission due to fluorescence and/or Raman scattering is filtered by the AOTF and directed to the two dimensional array detector which measures the intensity of the emitted light at the AOTF selected frequency.

Another object of the present invention is to provide a spectroscopic imaging device capable of generating 0.01–1.0 nm spectral resolution, and diffraction-limited spatial resolution images of the molecular species making up the sample. To that end, an imaging quality, laser referenced, Michelson interferometer is used as a spectral filter in conjunction with a two dimensional array detector to non-invasively and rapidly collect spectral images of a sample under conditions of high spatial resolution. The images are derived from the intrinsic electronic and vibrational absorptions and emissions of the material. In the present invention, the operation of the imaging interferometer is identical for both absorption and emission spectroscopic imaging.

To achieve absorption microscopy in accordance with the present invention using the interferometer, a broadband light source is directed toward the sample of interest. For thin samples, the light may be transmitted through the sample, or alternatively, for thick samples and opaque materials, the filtered light may be diffusely reflected by the sample. The transmitted or reflected light is collected and magnified with the microscope objective and projected towards the interferometer which acts as the spectral filter. The multiplexed spectral image output of the interferometer is directed to the two dimensional array detector which measures the intensity of the transmitted or reflected light at multiple locations within the sample. Multiple images are recorded while moving a mirror in one of the arms of the interferometer. This motion is achieved in a step-scan manner rather than a continuous manner with images recorded at different, static mirror retardations. The relative positions of the two mirrors and hence the amount of optical retardation is measured interferometrically using a helium-neon laser. After retrieving the spectroscopic information from the two dimensional array detector, the data is transformed and stored as a series of images at different wavelengths. This is achieved by a numerical technique known as a Fourier transform (FT), which transforms the data from intensity versus mirror displacement to intensity versus wavenumbers or wavelength. In addition, the digital spectral images are further manipulated and displayed using known spectroscopic, chemometric and image processing techniques.

For emission spectroscopy, monochromatic light (e.g. from a laser), or nearly monochromatic light (e.g. from a filtered arc lamp) is directed toward a sample to be analyzed. The resulting sample emission due to fluorescence and/or Raman scattering is multiplexed by the interferometer and directed to the two dimensional array detector which measures the intensity of the spectrally multiplexed emitted light as a function of mirror displacement. Again, using a Fourier transform technique, the data is transformed and stored as a series of images at different wavelengths. The stored data and images are then manipulated and displayed using known spectroscopic, chemometric and image processing techniques.

An advantage to the present invention includes the ability to rapidly and simultaneously record and analyze thousands of absorption spectra with diffraction limited spatial resolution and high spectral resolution.

While the invention will be described in connection with certain preferred embodiments, it is not intended that the invention be limited to those specific embodiments but rather that it be accorded the broad scope commensurate with the appended claims, consistent with the prior art.

BRIEF DESCRIPTION OF THE DRAWINGS

FIG. 3 is a schematic diagram of a typical image data set which may be acquired by the imaging spectroscopic microscope of the preferred embodiment shown in FIG. 1, for certain wavelengths of filtered light transmitted by or reflected from a sample.

FIG. 4a is a graph of intensity plotted against wavelength for a series of transmission values extracted from different images from FIG. 3 at a fixed XY coordinate within the sample.

FIG. 4b is a graph of intensity plotted against wavelength for a series of transmission values extracted from different images from FIG. 3 at a fixed XY coordinate within the sample, different than the fixed coordinate of FIG. 4a.

FIG. 10a is a graph of intensity plotted against mirror retardation of the interferometer of the preferred embodiment shown in FIG. 8, for a series of values extracted from a series of images at a fixed XY coordinate within the sample collected before applying the Fourier transform technique to the data.

FIG. 10b is a schematic diagram of typical data sets of images which may be acquired by the preferred embodiment shown in FIG. 8, for certain retardation values of the interferometer before applying the Fourier transform technique to the data.

FIG. 11a is a graph of intensity plotted against wavelength for a fixed XY coordinate in the sample after applying the Fourier transform technique to the data in FIG. 10a.

FIG. 11b is a schematic diagram of typical data sets of spectroscopic images at discrete wavelengths which may be observed after applying the Fourier transform technique to the data in FIG. 10b.

DETAILED DESCRIPTION OF THE PREFERRED EMBODIMENTS

Figure 1:
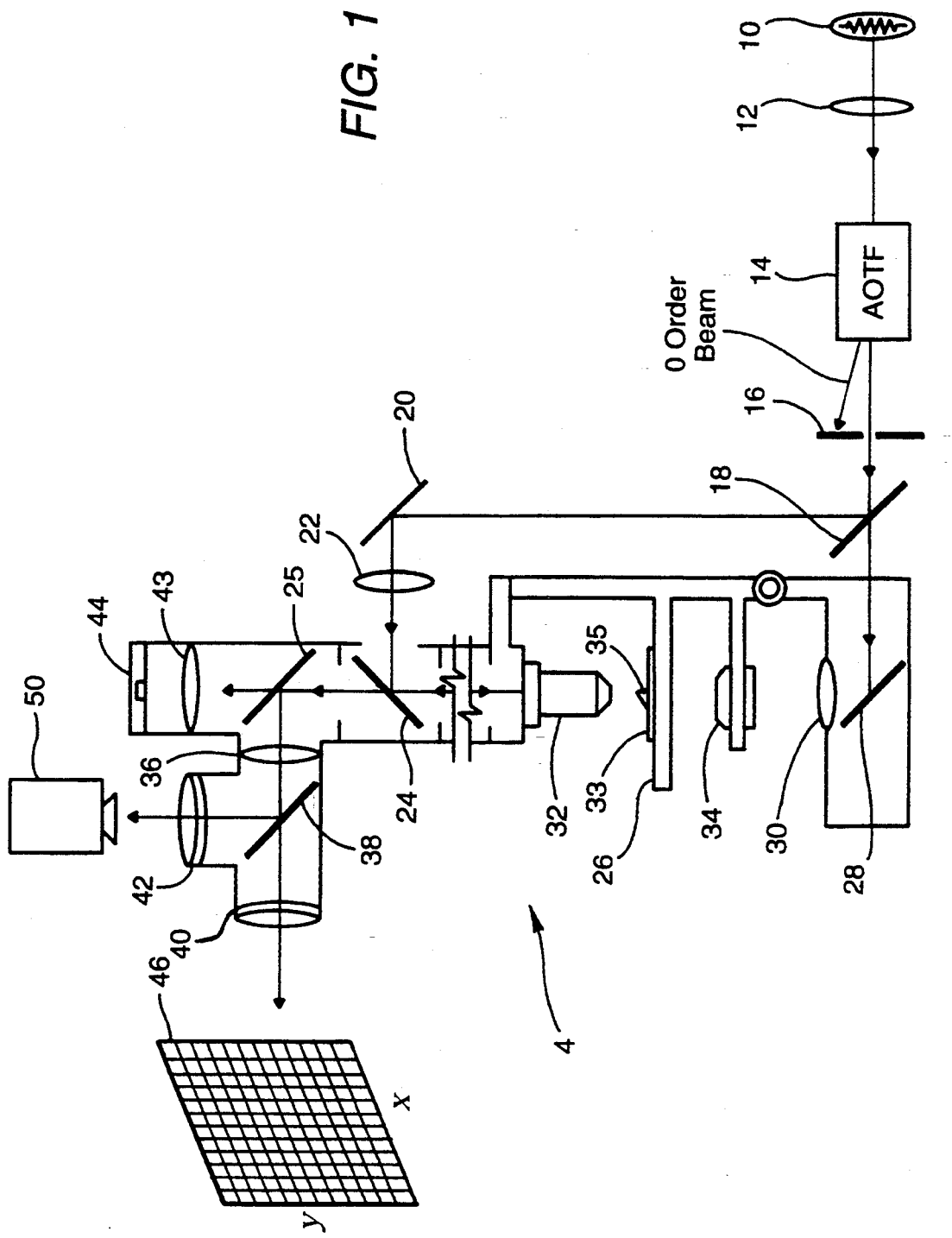
FIG. 1 is a schematic diagram of a preferred embodiment of the present invention—an imaging spectroscopic microscope—showing the arrangement of some of its major elements and the AOTF illumination scheme for both transmission and reflectance measurements.

Referring to FIG. 1, there is shown a preferred embodiment of the present invention in the form of an imaging spectroscopic microscope. The spectroscopic microscope consists generally of a light source 10, an AOTF 14, a microscope 4, a focal plane array detector 46, and a single point detector 44. The microscope 18 used in the illustrated embodiment of the present invention may be a modified Olympus BH-2 metallurgical microscope which includes a 10X (N.A. 0.30) plan achromat objective 32 and 2.5X projection eyepieces 40 and 42. The eyepiece 40 is used for collection, magnification and presentation to the focal plane array detector 46. The eyepiece 42 is used for collection, magnification and presentation to the video camera 50. The light source 10 may be a standard 50 Watt quartz tungsten halogen light source. The illustrated embodiment of the present invention also includes a single point detector 44 consisting of dual detectors of Silicon (Si) and Germanium (Ge), and a beamsplitter 38, which is a 50/50 cube beamsplitter. The Silicon and Germanium detectors may be of the type made by Oriel. The video camera 50 may be of the type made by Javelin and may be attached to a video monitor of the type made by Ikegami. While the above elements used in the illustrative embodiment of the present invention have been specifically identified above, many variations and substitutions, known to those skilled in the art, can be employed without deviating from the intended scope of the present invention.

Certain aspects of this embodiment are known in the art, including the AOTF. Briefly, an AOTF is an electronically tunable spectral bandpass filter which can be operated from the ultra-violet through the visible and into the infrared regions of the optical spectrum. The AOTF functions by the interaction of light with a travelling acoustic wave through an anisotropic medium. An acoustic transducer is bonded to an end of an acousto-optic crystal and an acoustic absorber is bonded to the other. The transducer converts a high frequency rf signal into a pressure wave which propagates laterally through the crystal. The acoustic absorber at the opposite end of the crystal eliminates acoustic reflections which would corrupt the primary acoustic waveform. The conservation of momentum between the incident and diffracted photon wave vectors and the acoustic wave vector determines the wavelength of the diffracted light. Optical tuning is achieved by selecting the rf frequency signal. The specific operation of an AOTF is illustrated more fully in Kurtz et al., "Rapid scanning fluorescence spectroscopy using an acousto-optic tunable filter" Rev. Sci. Instrum. Vol. 58, No. 11, November 1987, the entire description found therein being incorporated herein by reference.

In the present invention, the AOTF may be a Brimrose TEAF-.6-.1.2 L. The Brimrose crystal is constructed from tellurium dioxide ($TeO_2$), and the rf frequencies vary between 40-170 Mhz, generating wavelengths between 400-1900 nm. For any given crystal, the resolution is essentially fixed but may be varied by changing the acousto-optic interaction distance at the time of manufacture. The AOTF is entirely solid-state, containing no moving parts. Random-access filtering is possible in the time it takes for the acoustic wave to propagate the full length of the crystal, typically around 5 micro seconds. The AOTF in the illustrated embodiment of the present invention has a resolution of approximately 2.5 nm and an achievable tunability of approximately 0.1 nm with a wavelength repeatability of greater than 0.05 nm.

Focal plane array detectors, used in the present invention, are also well known in the art. The focal plane array detector 46 of the illustrated embodiment of the present invention contains silicon (Si) Charge Coupled Devices (CCDs), and may be a Spectrum One, made by Spex. Using a two dimensional array (576×384 pixels) of CCDs, the focal plane array detector 46 can measure the intensity of light incident upon it at multiple discrete locations, and transfer the information received to a computer, or similar device, for storage and analysis. The specific operation of a focal plane array detector is illustrated more fully in R. B. Bilhorn, P. M. Epperson, J. V. Sweedler and M. B. Denton, "Spectrochemical Measurements with Multi-Channel Integrating Detectors", Applied Spectroscopy 41, 1125, (1987), the entire description found therein being incorporated herein by reference.

FIG. 1 shows the path of light traveling through a preferred embodiment of the present invention illustrated therein. Light containing a wide range of wavelengths originates from the light source 10, and comes into contact with a collimation optic lens 12. The collimation lens 12 deflects the rays of light, making the rays parallel to each other, and directs the parallel rays toward the AOTF 14. The AOTF 14 is used to filter the collimated light at a selected wavelength. The wavelength, or range of wavelengths, is selected by the user under computer control. (A control system is discussed more fully below.) After light of a selected wavelength is emitted by the AOTF 14, it passes through a spatial filter 16. The spatial filter 16 blocks the 0 order beam of broad-band light and allows the light of the selected wavelength to pass.

At this point, the path of the spatially filtered light is determined by the desired mode of operation. The operator predetermines either transmission or reflectance, depending upon the thickness or opacity of the sample, or other considerations.

In the case of reflectance, epi-illumination is employed where the nearly monochromatic spectrally filtered light is reflected by a swing away mirror 18 toward a fixed mirror 20. The light is then reflected by the fixed mirror 20 and passed through a collection lens 22. The collection lens 22 assures that the intensity of the light that reaches a sample 35 is equivalent at each point within the sample 35. After passing through the collection lens 22, the light is reflected by a 50/50 beamsplitter 24 toward an XY stage 26 upon which a glass microscope slide 33 holding the sample 35 rests. The light then reflects away from the sample 35 and through the objective 32, which magnifies the light. The intensity of the light at this point depends upon the opacity and the absorption characteristics of the sample 35.

In the case of transmission, instead of the spectrally reflected light being reflected by the swing away mirror 18 toward the fixed mirror 20, the swing away mirror 18 is retracted away from the path of the light so that the light is reflected off a fixed mirror 28 toward a collection lens 30. The collection lens 30 assures that the intensity of the light hitting the sample 35 is equivalent at each point within the sample 35. The light then passes through a condenser 34 toward the XY stage 26 upon which the glass microscope slide 33 holding the sample 35 rests. The light that is not reflected or absorbed then passes through the sample 35 and then through the objective 32, which magnifies the light. Again, the intensity of the light at this point depends upon the opacity and the absorption characteristics of the sample 35.

In the case of reflectance, after the light is incident upon the sample 35, the light passes through the beamsplitter 24. In the case of transmission, beamsplitter 24 is retracted and light passes unaltered toward swing away mirror 25. In either case, at this point, the path of the light is again determined by the desired mode of operation. The operator predetermines either spectral imaging through the use of the focal plane array detector 46 or single point detection through the use of detector 44.

In the case of spectral imaging, the light is then reflected by the swing away mirror 25 away from the single point detector 44 toward a lens 36. The lens 36 forms an intermediate image of the collected light which is then split by the beamsplitter 38. The beamsplitter 38 directs the light toward two identical 2.5X projection eyepieces 40 and 42. The eyepieces 40 and 42 provide additional magnification and present flat-field spectral images to the focal plane array detector 46 and to the video camera 50, respectively. The video camera 50 is parfocal with the focal plane array detector 46 and operates with the video monitor, not shown, to position and focus the sample 35. The focal plane array detector 46 is cooled using Liquid Nitrogen ($LN_2$) to improve the operation of the CCDs.

In the case of single point detection, instead of reflecting the light using the swing away mirror 25 toward the lens 36, the swing away mirror 25 is retracted away from the path of the light so that the light is directed toward a focusing lens 43. The focusing lens 43 focuses the light on the single point detector 44. Microspectroscopy, commonly used on unknown materials, is achieved by the operator preselecting single point detection. Microspectroscopy provides survey spectral characterization of a selected region of interest of the unknown material, typically prior to the imaging of a sample. The survey scan typically provides the user with an indication of the bulk chemical composition of the sample 35 and indicates a wavelength range or series of wavelengths over which to collect images. By incorporating fast, single point detection, the illustrated embodiment of the present invention acquires survey spectra very rapidly. The silicon photodiode of the single point detector 44 is used to measure the intensity of the transmitted or reflected light for visible wavelength operation (400–1100 nm), while the germanium photodiode of the single point detector 44 is used for near-infrared operation (800–1800 nm). In the illustrated embodiment of the present invention, the single point detector 44 is operated uncooled, and accordingly, signal averaging is used to improve the signal to noise performance. Typically, several hundred averages are performed which increases the acquisition time of the survey spectra to several seconds. Alternatively, an improvement in the acquisition time can be achieved by using a more efficient photodiode material or by operating the single point detector 44 cooled.

Figure 2:
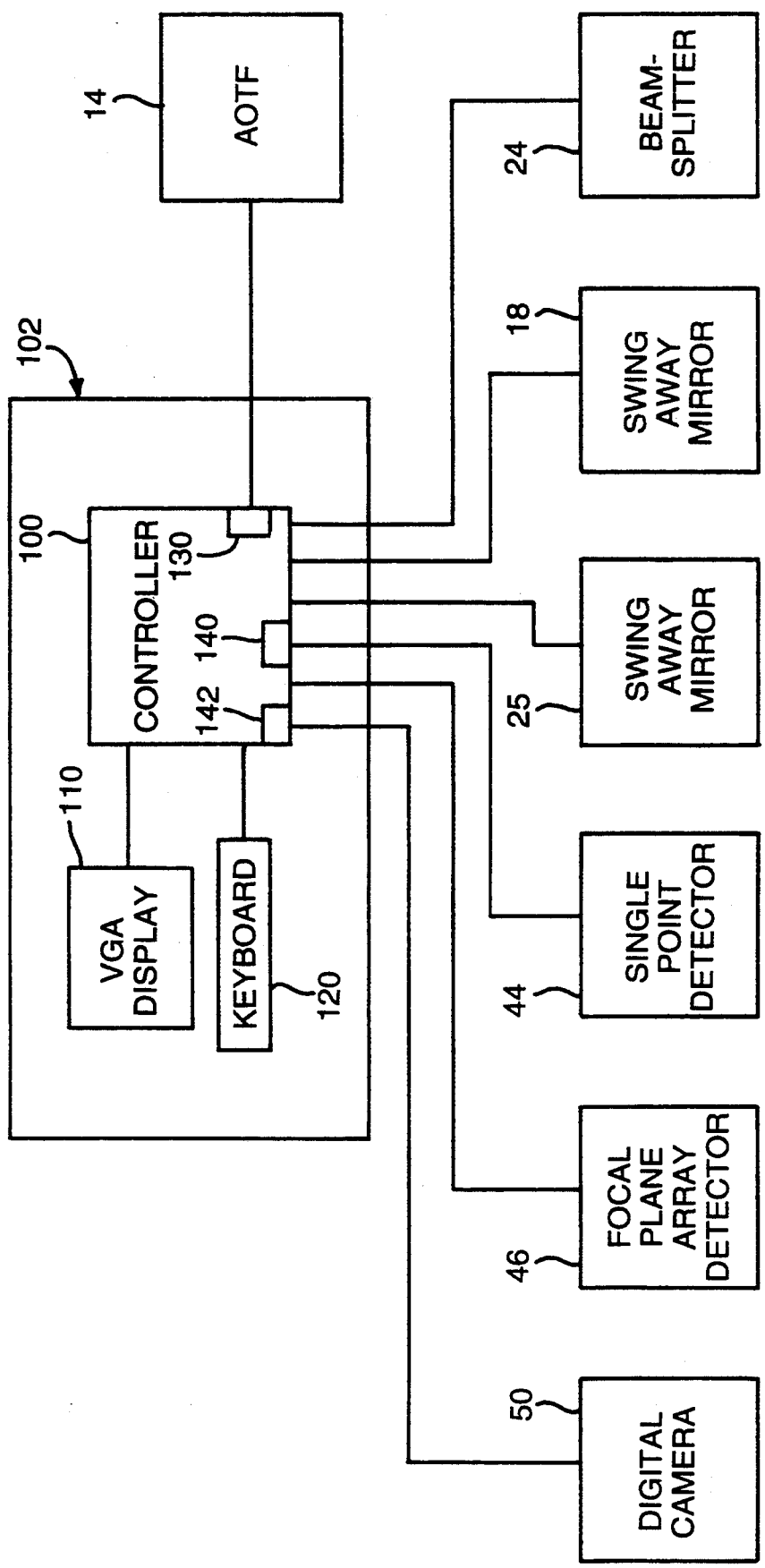
FIG. 2 is a block diagram of the electronic control system suitable for use in the practice of the present invention.

In accordance with the present invention, there is provided a control system 102 which controls the operation of the device. Referring to FIG. 2, there is shown a schematic diagram of the control system 102 which is usable with the illustrated embodiment of the present invention. The control system 102 consists generally of a controller 100, a display 100 and a keyboard 120. The controller 100 may be of the type referred to as a "Dell 310", an 80386-based computer. However, other microprocessor based controllers may be substituted for the Dell 310 computer without deviating from the invention. The display 110 may be a VGA monitor, and the keyboard 120 may be a standard Dell 310 compatible keyboard. Again, variations and substitutions, known to those skilled in the art, can be employed, if desired.

Software for the controller 100 may, for example, be written in the C programming language. The software allows the controller to, among other things, control the AOTF 14; position the swing away mirrors 18 and 25; position the beamsplitter 24; store the data acquired from the focal plane array detector 46; store data acquired from the single point detector 44; digitize and store the image from the video camera 50; and perform data manipulation and analysis. Contrast enhancement, pseudo-coloring and image presentation may be performed using a commercial image processing package, such as BioScan Optimas 3.0.

The controller 100 selects the wavelength of light emitted from the AOTF 14 by generating a 32 bit binary word for a particular wavelength. The 32 bit binary word is converted into an rf frequency by a synthesizer board 130. The value of the 32 bit binary word is based on the independent spectral calibration of the AOTF 14. A Fourier transform interferometer (not shown), well known in the art as a very accurate spectrometer, may be used to calibrate the AOTF 14. By recording the resulting wavelengths of light that the AOTF 14 emits for a test group of rf frequencies (e.g. approximately 30), polynomial approximation techniques may be used to calculate wavelength as a function of rf frequency.

The swing away mirrors 18 and 25 and the beamsplitter 24 are connected to the controller 100 via an interrupt driven RS232 communications link. RS232 communication links are well known in the art. The mirrors 18 and 25 and the beamsplitter 24 are moved repeatedly with high precision in and out of position depending upon whether reflectance or transmission is employed and whether spectral imaging or single point detection is desired. The movement of the swing away mirrors 18 and 25 and beamsplitter 24 are controlled by daisy-chained microstepper translation stages.

The Si CCDs of the focal plane array detector 46 store data as 16 bit binary integers. The controller 100 acquires the data from the CCDs of the focal plane array detector 46 and stores the data as 32 bit floating point numbers. Using 32 bit floating point numbers enhances the precision of the measured images. The Si and Ge photodiodes of the single point detector 44 contain output analog data signals. The controller 100 digitizes the analog signals to 16 bit precision using an analog to digital board 140 attached to the controller 100. The analog to digital board 140 may be of the type ATMIO-16, made by National Instruments. All data retrieved by the controller is stored in a Spectral Image File Format (SPIFF) file for later retrieval.

The controller 100 provides a means to capture a white light image of the sample from the digital video camera 50. The white light image is captured using a grabber board 142 attached to the controller 100. This white light image is also saved in the SPIFF file and is retrievable at a later time to provide the operator with a white light picture of the sample with which to compare the spectroscopic images and data. The grabber board 142 may be a Scorpion board, made by Univision.

The controller 100 also controls the timing of the AOTF 14 with the acquisition of data from either the focal plane array detector 46 or the single point detector 44. At a predetermined time, or as the AOTF 14 incrementally changes the wavelengths of the emitted light, the controller 100 obtains the data from either the focal plane array detector 46 or the single point detector 44 corresponding to the given wavelength.

Typically, the invention operates and is used as follows. First, the operator places a sample to be analyzed on the XY stage 26 of the imaging spectroscopic microscope. Next, the operator uses the digital video camera 50 to survey the sample and focus and frame the field of view for the subsequent collection of spectroscopic data. Then, the operator uses the keyboard 120 to select the various parameters which control the AOTF 14, the swing away mirrors 18 and 25, the beamsplitter 24, and the timing of the focal plane array detector 46 or single point detector 44 with the data collection of the controller 100. The parameters which the operator can choose in the illustrated embodiment of the present invention include 1) reflectance or transmission, 2) spectral imaging or single point detection, 3) wavelength range and wavelength increment, if any, of the light filtered from the AOTF 14, 4) integration time for imaging detection of each wavelength, 5) the number of scans or sweeps of the AOTF 14. Of course, it is appreciated that both the selection and the range of possible parameters depend upon the application and the type of analysis desired.

In the illustrated embodiment, integration times are varied to correct for intensity variations in detector response as a function of wavelength. Such response variations are inherent in any spectroscopic system. In an alternate embodiment, a partial correction for this response function is made automatically by either pre-recording the response variation or determining the response variation during run-time.

In the case of single point detection, the intensity at each wavelength is digitized by the analog to digital board 140 and stored in the SPIFF file and presented for display on the VGA screen 110. In the case of spectral imaging, the data from the focal plane array detector 46 is stored as a 32 bit floating point number in the SPIFF file for later manipulation and analysis. In addition to the data from the focal plane array detector 46, the single point detector 44, and the video camera 50, the SPIFF file also contains date, time, sample information, wavelength ranges, integration times, and other variable information in its header.

Once the data has been stored in the SPIFF file, a standard imaging analysis software package is used to display the results. Referring to FIG. 3, there is shown a schematic representation of typical data sets of images acquired by the imaging spectroscopic microscope for various wavelengths of filtered light transmitted or reflected from a sample. FIG. 3 shows 4 different planar images of the same sample for different wavelengths $\lambda 0$, $\lambda 1$, $\lambda 2$ and $\lambda n-1$. It should be appreciated that each planar image represents a third dimension of imaging distinct from a mere two dimensional spatial image. The spectroscopic images are generated from data derived from the intrinsic optical and vibrational absorptions, and chemical properties, of the material.

Referring to FIG. 4a, there is shown a graph of a series of transmission values extracted from different data sets of images from FIG. 3 at a fixed coordinate within the sample.

The graph represents the intensity of the light transmitted through or reflected away from a sample at a given fixed location $(X_{i1,j1})$ for each wavelength $\lambda 0$ through $\lambda n-1$. FIG. 4b is another graph of a series of transmission values extracted from different data sets of images from FIG. 3 at a fixed coordinate $(X_{i2,j2})$ within the sample different than the fixed coordinate of FIG. 4a. By way of example, at the point $(X_{i2,j2})$ in FIG. 4b for the wavelength $\lambda 0$, it can be seen that the relative intensity of light transmitted through or reflected away from a sample is lower than the intensity for wavelength $\lambda 1$. In other words, more light of wavelength $\lambda 0$ is absorbed than light of wavelength $\lambda 1$. This is readily apparent from FIG. 3 where the point $(X_{i2,j2})$ is much darker for wavelength $\lambda 0$ than for wavelength $\lambda 1$.

Figure 5A:
FIG. 5a is a diagram representing a spectroscopic image (taken at 520 nm) of a cross-section of human epithelia cells stained with a visible dye, hematoxylineosin using the spectroscopic imaging device of the present invention.
Figure 5B:
FIG. 5b is a diagram representing a spectroscopic image (taken at 710 nm) of a cross-section of human epithelia cells stained with a visible dye, hematoxylineosin using the spectroscopic imaging device of the present invention.

Referring to FIG. 5a, there is shown a diagram representing a spectroscopic image (taken at 520 nm) of a cross-section of human epithelia cells stained with a visible dye. FIG. 5b is another diagram representing a spectroscopic image (taken at 710 nm) of a cross-section of human epithelia cells stained with a visible dye. For FIG. 5a and FIG. 5b, total magnification provides a spatial resolving element of approximately 2.0 microns per pixel. Images were recorded over the wavelength range 400–800 nm at 2 nm increments using a 15 millisecond exposure at each wavelength. The total measurement time was 3 seconds. The 520 nm wavelength used to obtain the measurements of FIG. 5 corresponds to the absorption maximum of the histological stain. It is apparent that FIG. 5a provides significantly higher visual clarity and structural information than FIG. 5b. The apparent contrast in the image of FIG. 5a demonstrates the chemical differences in the arterial wall relative to the bulk material in this particular tissue type.

Figure 6:
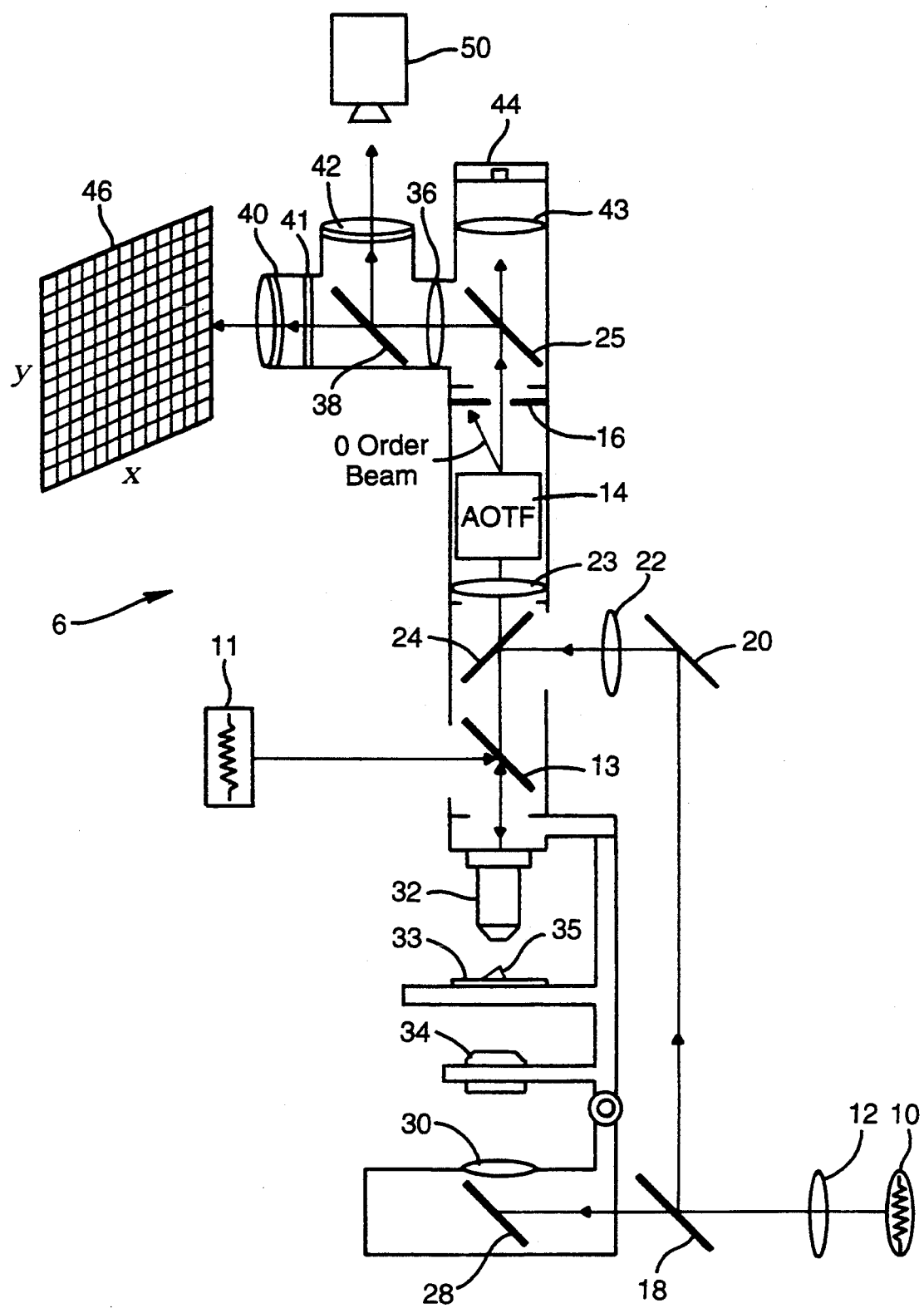
FIG. 6 is a schematic diagram of a preferred embodiment of the present invention—an imaging spectroscopic microscope—showing the arrangement of some of its major elements and the AOTF illumination scheme for emission spectroscopy.

Referring to FIG. 6, there is shown an alternate embodiment of the present invention in the form of an imaging spectroscopic microscope 6. The referenced numerals in FIG. 6 correspond to the components of FIG. 1 and function similarly. The AOTF 14 is positioned between the sample 35 and the focal plane array detector 46 to filter the light after the light has impinged upon the sample 35. A collimation lens 23 is also positioned between the AOTF 14 and the sample 35. With the configuration shown in FIG. 6, in addition to absorption spectroscopic imaging studies, emission spectroscopic imaging may be achieved, including fluorescence and Raman imaging. Holographic Raman filters 41 are positioned between the AOTF 14 and the focal plane array detector 46. The filters 41 are removeable and used exclusively for measuring Raman emission. The filters 41 are used to selectively block the laser radiation, while allowing the weaker Raman scattered photons to pass through to the focal plane array detector 46. The holographic filters exhibit improved performance relative to dielectric interference filters, namely, uniform transmission and sharper cut-on. The operation of the embodiment shown in FIG. 6 is very similar to the operation of the embodiment shown in FIG. 1.

To achieve absorption spectroscopy in the embodiment shown in FIG. 6, a dichroic beamsplitter 13 is retracted, and the broad-band light source 10 directs light toward the sample to be analyzed. After impinging upon the sample 35, the transmitted or reflected broad-band light is then filtered by the AOTF 14 and directed toward either the focal plane array detector 46 or the single point detector 44, depending upon the desired operation as described above for the embodiment shown in FIG. 1.

To achieve emission spectroscopy in the embodiment shown in FIG. 6, a non-filtered light source 11 directs light toward the beamsplitter 13. The non-filtered light source 11 may be a laser. The beamsplitter 13 then directs the non-filtered light toward the sample 35 to be analyzed. After the non-filtered light has impinged upon the sample 35, the resulting emission from the sample 35 is directed toward the AOTF 14. Then the AOTF 14 filters the emitted light at a selected wavelength and directs the filtered light toward either the focal plane array detector 46 or the single point detector 44, again depending upon the desired mode of operation.

Figure 7:
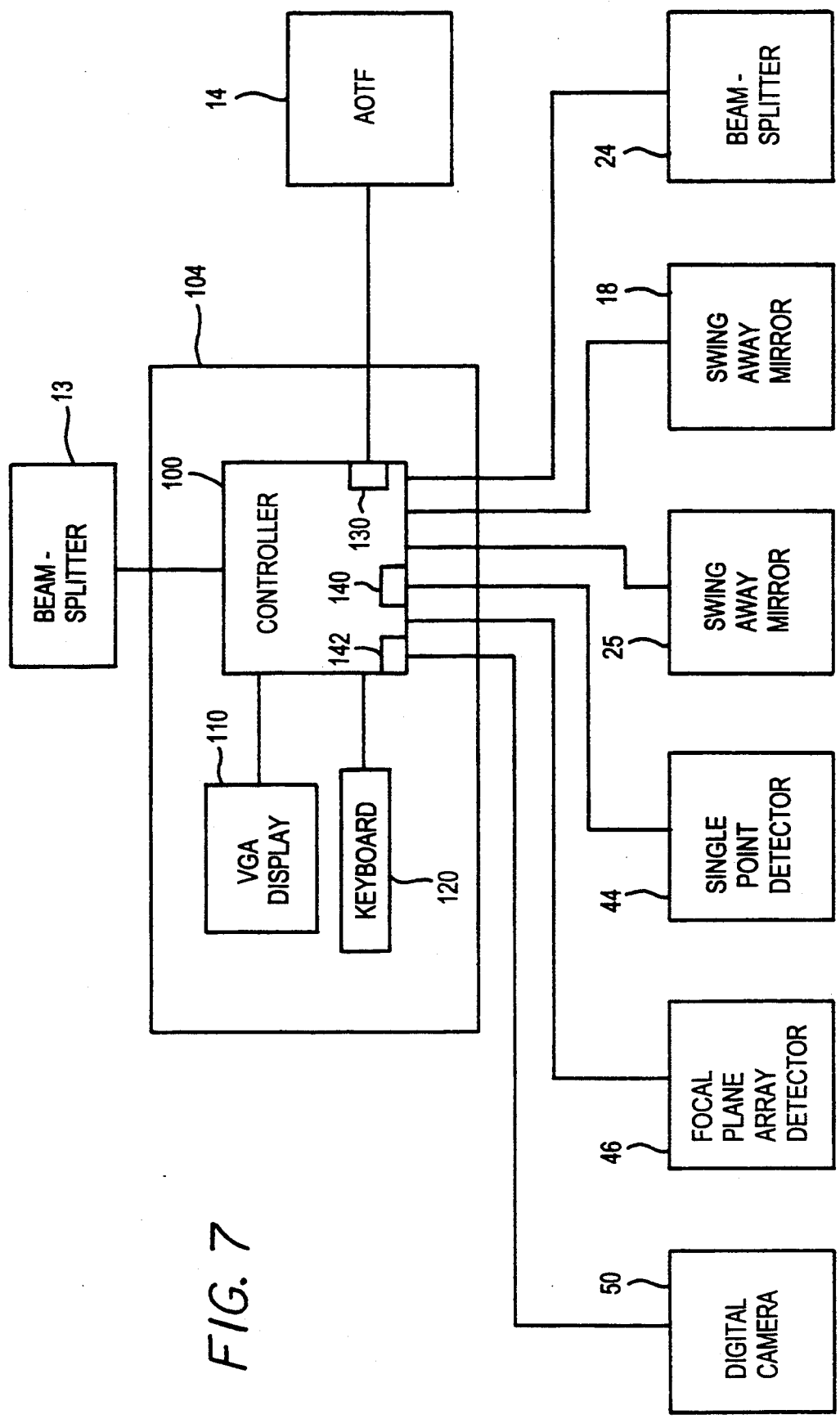
FIG. 7 is a block diagram of the electronic control system suitable for use in the practice of the embodiment of the present invention shown in FIG. 6.

A control system 104, shown in FIG. 7, is usable with the embodiment shown in FIG. 6. The referenced numerals in FIG. 7 correspond to the components of FIG. 2 and function similarly. The controller 100, among other things, controls the AOTF 14; positions the swing away mirrors 18 and 25; positions the beamsplitters 13 and 24; stores the data acquired from the focal plane array detector 46; stores the data acquired from the single point detector 44; digitizes and store the image from the video camera 50; and performs data manipulation and analysis. Ultimately, contrast enhancement, pseudo-coloring and image presentation may be performed using a commercial image processing package, such as BioScan Optimas 3.0.

Figure 8:
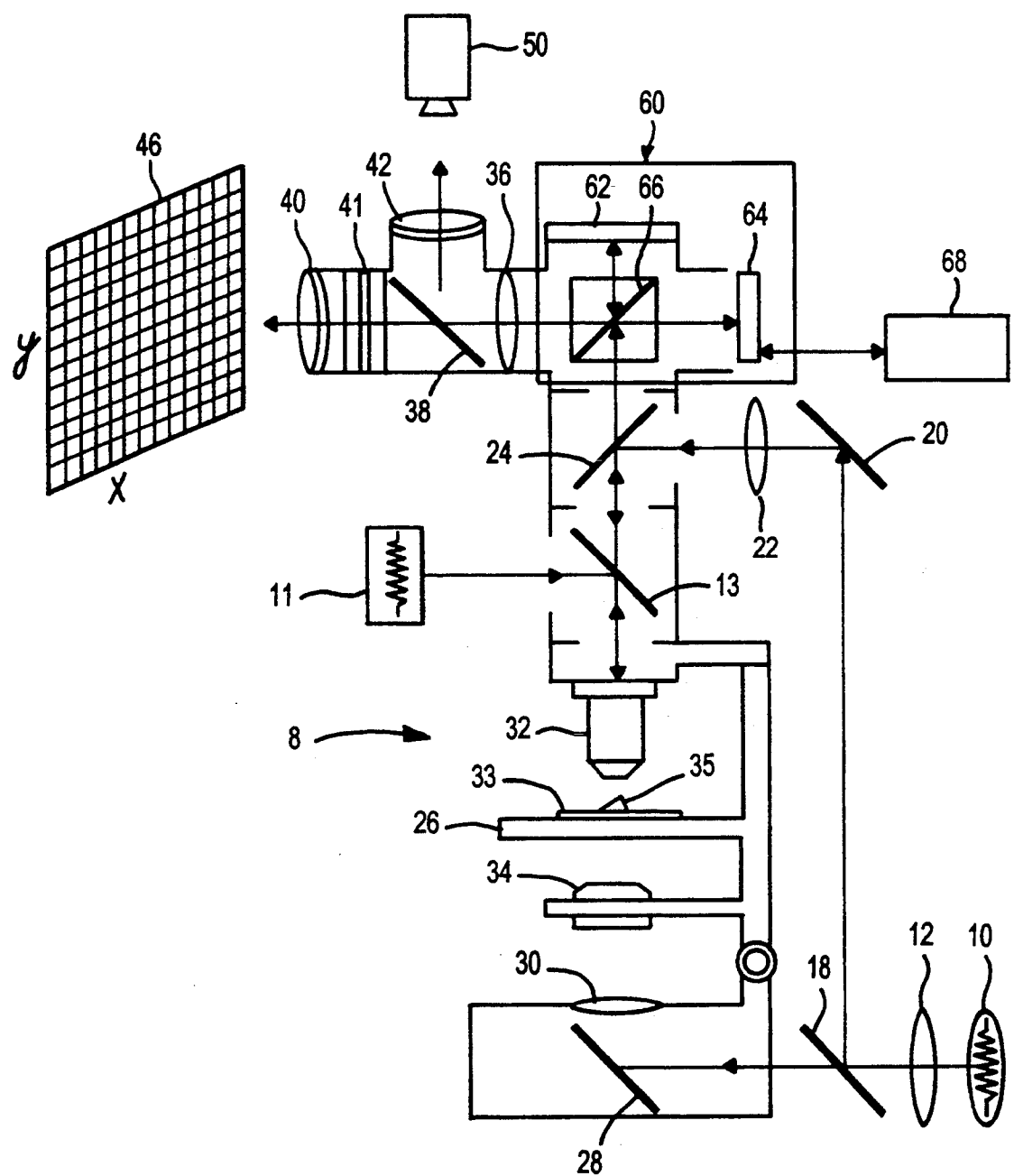
FIG. 8 is a schematic diagram of a preferred embodiment of the present invention—an imaging spectroscopic microscope—showing the arrangement of some of its major elements and the interferometer illumination scheme for both transmission and reflectance measurements, as well as emission spectroscopy.

Referring to FIG. 8, there is shown an alternate embodiment of the present invention in the form of an imaging spectroscopic microscope 8. The referenced numerals in FIG. 8 correspond to the components of FIG. 6 and function similarly. An interferometer 60 positioned between the sample 35 and the focal plane array detector 46. The operation of the embodiment shown in FIG. 8 is very similar to the operation of the embodiment shown in FIG. 6, except the interferometer 60 shown in FIG. 8 essentially performs the function of the AOTF 14 shown in FIG. 6. The embodiment shown in FIG. 8 achieves both absorption spectroscopic imaging and emission spectroscopic imaging, including fluorescence and Raman imaging. Holographic Raman filters 41 are positioned between the interferometer 60 and the focal plane array detector 46. The filters 41 are removeable and used exclusively for measuring Raman emission. The filters 41 are used to selectively block the laser radiation, while allowing the weaker Raman scattered photons to pass through to the focal plane array detector 46. The holographic filters exhibit improved performance relative to dielectric interference filters, namely, uniform transmission and sharper cut-on.

The function of the interferometer 60 is to spectrally filter the light. To achieve absorption spectroscopy in the embodiment shown in FIG. 8, a dichroic beamsplitter 13 is retracted, and the broad-band light source 10 directs light toward the sample to be analyzed. After impinging upon the sample 35, the transmitted or reflected broad-band light is then directed toward the interferometer 60. To achieve emission spectroscopy in the embodiment shown in FIG. 8, a non-filtered light source 11 directs light toward the beamsplitter 13. The non-filtered light source 11 may be a laser. The beamsplitter 13 then directs the non-filtered light toward the sample 35 to be analyzed. After the non-filtered light has impinged upon the sample 35, the resulting emission from the sample 35 is directed toward the interferometer 60. For both absorption and emission spectroscopy, after the light is directed toward the interferometer 60, the operation of the interferometer 60 is essentially the same.

The interferometer 60 consists generally of a fixed mirror 62, a moveable mirror 64, a beamsplitter 66, and a measuring laser 68. The light directed toward the interferometer 60 is directed by the beamsplitter 66 to the fixed mirror 62 and moveable mirror 64. Initially, the fixed mirror 62 and moveable mirror 64 are located an equal distance from the beamsplitter 66. In this initial position, the light directed to the mirrors 62 and 64 is reflected back toward the beamsplitter 66 and recombined, in phase, before being directed toward the lens 36. Then, the moveable mirror 64 is incrementally retarded away from the beamsplitter 66. The incremental motion of the moveable mirror 64 is controlled by the controller 100, shown in FIG. 9. The relative position of the two mirrors, and hence the amount of optical retardation, is measured interferometrically using the measuring laser 68. The measuring laser 68 may be a helium-neon (HeNe) laser. A typical increment of retardation is one-half the wavelength of the light of the measuring laser 68.

With the moveable mirror incrementally retarded, the light that is directed toward the fixed mirror 62 and the moveable mirror 64 is reflected back toward the beamsplitter 66 and recombined before being directed toward the lens 36. However, because the moveable mirror 64 was incrementally retarded, the light that is recombined by the beamsplitter 66 is slightly out of phase. By continuing to incrementally retard the moveable mirror 64, and measuring the intensity of light at each incremental step using the focal plane array detector 46, a multiplexed spectral output at multiple locations within the sample is obtained.

Figure 9:
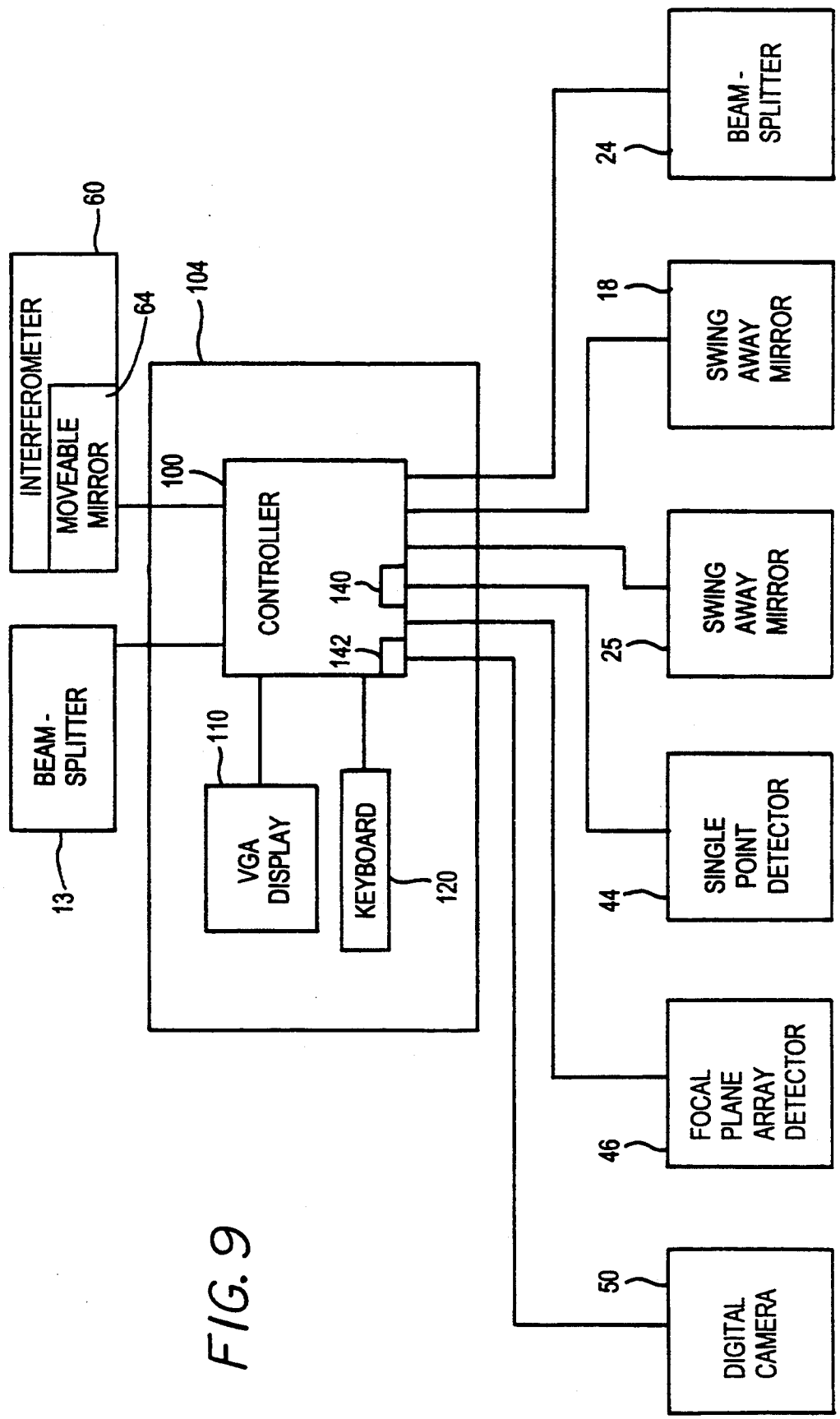
FIG. 9 is a block diagram of the electronic control system suitable for use in the practice of the embodiment of the present invention shown in FIG. 8.

A control system 106, shown in FIG. 9, is usable with the embodiment shown in FIG. 8. The referenced numerals in FIG. 9 correspond to the components of FIG.

7 and function similarly. The controller 100, among other things, controls the moveable mirror 64 of the interferometer 60; positions the swing away mirrors 18 and 25; positions the beamsplitters 13 and 24; stores the data acquired from the focal plane array detector 46; manipulates the data acquired from the focal plane array detector 46 to create data sets of spectroscopic images; digitizes and store the image from the video camera 50; and performs data manipulation and analysis. Ultimately, contrast enhancement, pseudo-coloring and image presentation may be performed using a commercial image processing package, such as BioScan Optimas 3.0. The controller 100 may also control a single point detector 44 which may be added to the embodiment shown in FIG. 8 if single point detection is desired. If so, the single point detector 44 may be positioned where the video camera 50 is located.

Referring to FIG. 10a, there is shown a graph of the intensity of the multiplexed spectral output plotted against the distance of retardation of the interferometer 60 for a series of values collected by the focal plane array detector 46 at a fixed coordinate within the sample 35. Referring to FIG. 10b, there is shown a schematic diagram of typical data sets of images acquired by the focal plane array detector 46 for a certain retardation values (i.e. 1, 2, 3, $2^n$) of the interferometer 60. The symbols "H", "F", "E", and "T" shown in FIG. 10b are representative of multiple sections of the sample 35, each section having its own spectral characteristics. However, the spectral characteristics of the sections can not be readily determined simply by displaying the multiplexed spectral output of the interferometer 60 in FIGS. 10a and 10b. Further data manipulation is required to display the spectral characteristics of the sections of the sample 35.

After retrieving and storing the multiplexed spectral data from the focal plane array detector 46, the controller 100 transforms the data into spectroscopic image data by a well-known numerical technique known as a Fourier transform (FT). The FT technique transforms the data from intensity versus mirror retardation to intensity versus wavenumbers or wavelength. Then, the spectroscopic image data is further manipulated and displayed using known spectroscopic, chemometric and image processing techniques.

Referring to FIG. 11a, there is shown a graph of intensity plotted against wavelength observed after applying the Fourier transform technique to the data in FIG. 10a at the fixed coordinate within the sample. Referring to FIG. 11b, there is shown a schematic diagram of certain data sets of spectroscopic images at discrete wavelengths observed after applying the Fourier transform technique to the data in FIG. 10b. The spectral characteristics of the sections of the sample 35 can now be readily seen.

Alternate embodiments of the present invention use indium antinomide (InSb) or platinum silicide (PtSi), for use in the focal plane array detector or single point detector, which deliver enhanced infrared sensitivity to the photon energy of the light emitted, transmitted through, or reflected away from the sample. By using InSb detectors, the alternate embodiment of the present invention can be used at higher wavelengths (up to 5500 nm), well into the infrared region. In other embodiments, detectors could be made of iridium silicide (IrSi), or other materials to allow spectral imaging techniques to wavelengths of 12000 nm.

While the illustrated embodiment of the present invention includes an imaging spectroscopic microscope, the present invention can be applied to other traditional absorption or emission spectroscopic approaches. These techniques may be applied in, for example, areas involving biological materials, polymers, semi-conductors and situations involving remote sensing.

For example, an alternate embodiment of the present invention achieves macroscopic spectroscopic imaging by substituting a macroscopic lens, such as a typical 50 mm camera lens, for the modified microscope device shown in the illustrated embodiments. In such a case, the macroscopic lens directs light, such as ambient room light, that has been reflected or emitted from a sample toward the focal plane array detector 46. The controller 100 then collects, manipulates and displays the resulting macroscopic spectroscopic images.

We claim:

1. A spectroscopic imaging device employing imaging quality spectral filters suitable for use in near-infrared absorption microscopy comprising:
    a source of broadband light;
    collimation means for directing said broad-band light at an acousto-optic tunable filter, the acousto-optic tunable filter being of the type which is optically tunable by applying an input signal of a selected frequency to the filter;
    means operatively connected to the acousto-optic tunable filter for applying said input signal to the acousto-optic tunable filter thereby selecting a near-infrared wavelength of the broadband light to be filtered by the acousto-optic tunable filter and passed through the acousto-optic tunable filter;
    means for directing said filtered light toward a subject to be analyzed; and
    means for directing light transmitted or reflected from each of a plurality of spatial locations within said subject in response to said filtered light impinging upon said subject at a focal plane array detector comprising a two-dimensional array of charge coupled devices, wherein said charge coupled devices of said focal plane array detector measure the intensity of light transmitted or reflected from each of said plurality of spatial locations.

2. The spectroscopic imaging device of claim 1 further comprising means for displaying an image of said subject derived from said intensity of the transmitted or reflected light at one or more wavelengths.

3. The spectroscopic imaging device of claim 1 further comprising means for processing and analyzing said intensity of the transmitted or reflected light.

4. The spectroscopic imaging device of claim 1 further comprising means for achieving single point spectroscopic detection of said subject.

5. A spectroscopic imaging device employing imaging quality spectral filters suitable for use in Raman emission microscopy comprising:
    a high intensity monochromatic light source;
    means for directing said monochromatic light toward a subject to be analyzed;
    collimation means for directing light emitted from each of a plurality of spatial locations within said subject in response to said monochromatic light source impinging upon said subject at an acousto-optic tunable filter, the acousto-optic tunable filter being of the type which is optically tunable by applying an input signal of a selected frequency to the filter;

means operatively connected to the acousto-optic tunable filter for applying said input signal to the acousto-optic tunable filter thereby selecting a desired wavelength of said emitted light to be filtered by the acousto-optic tunable filter and passed through the acousto-optic tunable filter while maintaining image fidelity of the subject; and means for directing said filtered light at a focal plane array detector comprising a two-dimensional array of charge coupled devices, including collimation means and one or more Raman filters, wherein said charge coupled devices of said focal plane array detector measure the intensity of emitted light from each of said plurality of spatial locations of the subject.

6. The spectroscopic imaging device of claim 5 further comprising means for displaying an image of said subject derived from said intensity of the emitted light at one or more wavelengths.

7. The spectroscopic imaging device of claim 5 further comprising means for processing and analyzing said intensity of the emitted light.

8. The spectroscopic imaging device of claim 5 further comprising means for achieving single point spectroscopic detection of said subject.

9. A spectroscopic imaging device employing imaging quality spectral filters suitable for use in Fluorescence emission microscopy comprising:

a substantially monochromatic light source;

means for directing said monochromatic light toward a subject to be analyzed;

collimation means for directing fluorescent light emitted from each of a plurality of spatial locations within said subject in response to said monochromatic light source impinging upon said subject at an acousto-optic tunable filter, the acousto-optic tunable filter being of the type which is optically tunable by applying an input signal of a selected frequency to the filter;

means operatively connected to the acousto-optic tunable filter for applying said input signal to the acousto-optic tunable filter thereby selecting a desired wavelength of said fluorescent light to be filtered by the acousto-optic tunable filter and passed through the acousto-optic tunable filter while maintaining image fidelity of the subject; and means for collimating and directing said filtered light at a focal plane array detector comprising a two-dimensional array of charge coupled devices, wherein said charge coupled devices of said focal plane array detector measures the intensity of the filtered light from each of said plurality of spatial locations of the subject.

10. The spectroscopic imaging device of claim 9 further comprising means for displaying an image of said subject derived from said intensity of the filtered light at one or more wavelengths.

11. The spectroscopic imaging device of claim 9 further comprising means for processing and analyzing said intensity of the filtered light.

12. The spectroscopic imaging device of claim 9 further comprising means for achieving single point spectroscopic detection of said subject.

13. A spectroscopic imaging device employing imaging quality spectral filters suitable for use in Raman emission microscopy comprising:

a high intensity monochromatic light source;

means for directing said monochromatic light toward a subject to be analyzed;

collimation means for directing light emitted from each of a plurality of spatial locations within said subject in response to said monochromatic light source impinging upon said subject at a step-scan interferometer, the step-scan interferometer being of the type which has at least one movable mirror which can be incrementally retarded to produce a multiplexed spectral output of the light passing through the interferometer;

means operatively connected to the interferometer for selecting known retardations of said movable mirror of said interferometer, wherein said step-scan interferometer maintains the image fidelity of the subject as said emitted light passes through the interferometer; and means for collimating and directing said emitted light passing through the interferometer at a focal plane array detector comprising a two-dimensional array of charge coupled devices, wherein said charge coupled devices of said focal plane array detector measures the intensity of emitted light from each of said plurality of spatial locations of the subject at each of a plurality of said known retardations of the movable mirror.

14. The spectroscopic imaging device of claim 13 further comprising means for converting said intensity of said light from optical retardation to wavelength.

15. The spectroscopic imaging device of claim 14 further comprising means for displaying an image of said subject derived from said intensity of said light at one or more wavelengths.

16. A spectroscopic imaging device employing imaging quality spectral filters suitable for use in Fluorescence emission microscopy comprising:

a substantially monochromatic light source;

means for directing said monochromatic light toward a subject to be analyzed;

collimation means for directing fluorescent light emitted from each of a plurality of spatial locations within said subject in response to said monochromatic light source impinging upon said subject at a step-scan interferometer, the step-scan interferometer being of the type which has at least one movable mirror which can be incrementally retarded to produce a multiplexed spectral output of the light passing through the interferometer;

means operatively connected to the interferometer for selecting known retardations of said movable mirror of said interferometer, wherein said step-scan interferometer maintains the image fidelity of the subject as said fluorescent light passes through the interferometer; and means for collimating and directing said fluorescent light passing through the interferometer at a focal plane array detector comprising a two-dimensional array of charge coupled devices, wherein said charge coupled devices of said focal plane array detector measures the intensity of emitted light from each of said plurality of spatial locations of the subject at each of a plurality of said known retardations of the movable mirror.

17. The spectroscopic imaging device of claim 16 further comprising means for converting said intensity of said light from optical retardation to wavelength.

18. The spectroscopic imaging device of claim 16 further comprising means for displaying an image of said subject derived from said intensity of said light at one or more wavelengths.

19. A spectroscopic imaging device employing imaging quality spectral filters suitable for use in near-infrared and infrared absorption microscopy comprising:

a source of broadband light;

means for directing said broadband light toward a subject to be analyzed;

collimation means for directing light transmitted or reflected from each of a plurality of spatial locations within said subject in response to said broadband light source impinging upon said subject at a step-scan interferometer, the step-scan interferometer being of the type which has at least one movable mirror which can be incrementally retarded to produce a multiplexed spectral output of the light passing through the interferometer;

means operatively connected to the interferometer for selecting known retardations of said movable mirror of said interferometer, wherein said step-scan interferometer maintains the image fidelity of the subject as said transmitted or reflected light passes through the interferometer; and means for collimating and directing said transmitted or reflected light passing through the interferometer at a focal plane array detector comprising a two-dimensional array of charge coupled devices, wherein said charge coupled devices of said focal plane array detector measures the intensity of said transmitted or reflected light from each of said plurality of spatial locations of the subject at each of a plurality of said known retardations of the movable mirror.

20. The spectroscopic imaging device of claim 19 further comprising means for converting said intensity of said light from optical retardation to wavelength.

21. The spectroscopic imaging device of claim 19 further comprising means for displaying an image of said subject derived from said intensity of said light at one or more wavelengths.

* * * * *